US011999575B2

United States Patent
Grupp et al.

(10) Patent No.: US 11,999,575 B2
(45) Date of Patent: Jun. 4, 2024

(54) PARCEL PROCESSING SYSTEM AND METHOD INCLUDING HYBRID ORIENTATION ACTIVE MERGE INDUCTION EQUIPMENT

(71) Applicant: Körber Supply Chain LLC, DFW Airport, TX (US)

(72) Inventors: Francisco Grupp, Trophy Club, TX (US); Michael D. Carpenter, Arlington, TX (US)

(73) Assignee: Körber Supply Chain LLC, DFW Airport, TX (US)

(*) Notice: Subject to any disclaimer, the term of this patent is extended or adjusted under 35 U.S.C. 154(b) by 185 days.

(21) Appl. No.: 17/779,155

(22) PCT Filed: Dec. 4, 2020

(86) PCT No.: PCT/US2020/063241
§ 371 (c)(1),
(2) Date: May 24, 2022

(87) PCT Pub. No.: WO2021/113594
PCT Pub. Date: Jun. 10, 2021

(65) Prior Publication Data
US 2022/0411201 A1 Dec. 29, 2022

Related U.S. Application Data

(60) Provisional application No. 62/944,744, filed on Dec. 6, 2019.

(51) Int. Cl.
*B65G 47/68* (2006.01)
*B07C 1/02* (2006.01)
(Continued)

(52) U.S. Cl.
CPC ............. *B65G 47/681* (2013.01); *B07C 1/02* (2013.01); *B65G 47/52* (2013.01); *B65G 47/682* (2013.01); *B65G 43/10* (2013.01)

(58) Field of Classification Search
CPC ...... B01C 1/02; B65G 47/682; B65G 47/681; B65G 43/10; B65G 47/52
(Continued)

(56) References Cited

U.S. PATENT DOCUMENTS 4,526,266 A * 7/1985 Dietz ................. B65G 21/2018
198/457.03
4,915,209 A 4/1990 Canziani
(Continued)

FOREIGN PATENT DOCUMENTS

| EP | 0130810 A1 * | 9/1985 | ............... B07C 1/02 |
| EP | 3284705 A1 | 2/2018 | |

OTHER PUBLICATIONS

International Search Report corresponding to application No. PCT/US2020/063241; 7 pages.

*Primary Examiner* — James R Bidwell
(74) *Attorney, Agent, or Firm* — Price Heneveld LLP (57) ABSTRACT

A parcel processing system (400) includes infeed conveyors (404, 406, 408) each conveying parcels (106) with an assigned orientation class, a merging conveyor (410) configured to merge parcels fed by the infeed conveyors into a single stream of parcels, and an induction conveyor (200) configured to feed the merged stream of parcels along an induction feed path (202) to a sorting conveyor (100). The infeed paths (404a, 406a) of the infeed conveyors are arranged at different angular orientations in relation to a merging feed path (412) of the merging conveyor such that each parcel in the merged stream of parcels has an orientation that is dependent upon its assigned orientation class. The merging conveyor (410) includes a multi-axis transport (Continued)

mechanism configured to move parcels along a principal axis parallel to the merging feed path and a secondary axis perpendicular to the principal axis, the merging conveyor being operable to selectively activate movement along the secondary axis for centering parcels being loaded thereon.

20 Claims, 8 Drawing Sheets

(51) Int. Cl.
*B65G 43/10* (2006.01)
*B65G 47/52* (2006.01)

(58) Field of Classification Search
USPC .................................................. 198/448, 363
See application file for complete search history.

(56) References Cited

U.S. PATENT DOCUMENTS

| | | |
|---|---|---|
| 5,588,520 A | 12/1996 | Affaticati et al. |
| 6,209,703 B1 * | 4/2001 | Soldavini ............... B65G 47/71 |
| | | 198/370.06 |
| 6,478,138 B1 * | 11/2002 | Edwards ............. B65G 17/345 |
| | | 198/370.06 |
| 7,344,018 B2 | 3/2008 | Constanzo et al. |
| 9,227,228 B2 * | 1/2016 | Kim ......................... B07C 5/00 |
| 9,309,058 B2 * | 4/2016 | Maglaty ................ B65G 43/10 |
| 2009/0065330 A1 | 3/2009 | Lupton et al. |
| 2014/0353122 A1 | 12/2014 | German et al. |
| 2018/0339865 A1 * | 11/2018 | Schroader ............. G06V 20/52 |

\* cited by examiner

FIG. 8

PARCEL PROCESSING SYSTEM AND METHOD INCLUDING HYBRID ORIENTATION ACTIVE MERGE INDUCTION EQUIPMENT

CROSS REFERENCE TO RELATED APPLICATIONS

This application claims priority to the U.S. provisional application No. 62/944,744 filed Dec. 6, 2019, which is incorporated by reference herein in its entirety.

TECHNICAL FIELD

The present disclosure relates generally to the field of mail and parcel processing, and in particular, to a system and method for providing an optimized orientation of parcels being inducted into a parcel sorter.

BACKGROUND

A parcel sorter includes a sorting conveyor where parcels are loaded at a loading or induction point and each parcel is selectively unloaded at one of multiple unloading points or outputs based on a destination associated with the parcel. In one construction, a sorting conveyor includes discrete parcel carrying units moved along a sorter feed path. The parcel carrying units may comprise cross-belts to enable loading and unloading of parcels. Productivity and reliability of parcel sorters, for example of the type mentioned above, are highly sensitive to the precise orientation of parcels being inducted.

SUMMARY

Aspects of the present disclosure provide flexible, accurate orientation in induction, to allow a parcel sorter with carrying units of a given size to accommodate the broadest range of parcel sizes, thereby generating the fewest possible exceptions.

A first aspect of the disclosure sets for a parcel processing system. The parcel processing system comprises a plurality of infeed conveyors each conveying parcels with an assigned orientation class. The parcel processing system further comprises a merging conveyor configured to merge parcels fed by the infeed conveyors into a single stream of parcels. The parcel processing system further comprises an induction conveyor configured to feed the merged stream of parcels along an induction feed path to a sorting conveyor. The sorting conveyor comprises a plurality of parcel carrying units moving along a sorter feed path inclined at an angle to the induction feed path. The infeed conveyors are arranged to feed parcels to the merging conveyor along respective infeed paths, the infeed paths being arranged at different angular orientations in relation to a merging feed path of the merging conveyor such that each parcel in the merged stream of parcels has an orientation that is dependent upon the assigned orientation class of that parcel. The merging conveyor comprises a multi-axis transport mechanism configured to move parcels along a principal axis parallel to the merging feed path and a secondary axis perpendicular to the principal axis. The merging conveyor is operable to selectively activate movement along the secondary axis for centering parcels being loaded on to the merging conveyor.

A second aspect of the disclosure sets forth a method for processing parcels. The method comprises conveying parcels with an assigned orientation class to a respective infeed conveyor of a plurality of infeed conveyors. The method further comprises merging parcels fed by the infeed conveyors into a single stream of parcels on a merging conveyor. The method further comprises feeding the merged stream of parcels by an induction conveyor along an induction feed path to a sorting conveyor, the sorting conveyor comprising a plurality of parcel carrying units moving along a sorter feed path inclined at an angle to the induction feed path. The infeed conveyors are arranged to feed parcels to the merging conveyor along respective infeed paths, the infeed paths being arranged at different angular orientations in relation to a merging feed path of the merging conveyor such that each parcel in the merged stream of parcels has an orientation that is dependent upon the assigned orientation class of that parcel. The merging conveyor comprises a multi-axis transport mechanism configured to move parcels along a principal axis parallel to the merging feed path and a secondary axis perpendicular to the principal axis. The method further comprises controlling the merging conveyor to selectively activate movement along the secondary axis for centering parcels being loaded on to the merging conveyor.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

As used herein, the term "parcel" refers to any item being processed as described, including a box, tube, irregularly shaped item, or otherwise.

For the physical dimensions, the general use of the terms "length," "width," and "height" are as follows: "length" refers to the longest dimension, "height" refers to the shortest dimension, and "width" refers to the dimension that is between those. Where two dimensions are the same, the terms may be interchangeable. In general, a parcel being transported will lay on the conveying system so that its length and width extend along and across the surface of the conveying system, and its height represents its height above the surface of the conveying system. For example: a rectangular parcel or tubular parcel may have different length, width, and height, a square parcel may have equal length and width but a different height, and a cubic parcel may have equal length, width, and height.

Orientation of a parcel is defined in terms of the angle of the long axis (i.e., axis parallel to the length dimension) of the parcel in relation to a feed path of the conveying system transporting the parcel. A "lengthwise" orientation refers to an orientation where the long axis is substantially parallel to the feed path. A "crosswise" orientation refers to an orientation where the long axis is substantially perpendicular to the feed path.

The disclosed embodiments relate to a cross-belt parcel sorter. However, the underlying technical features may be applied to other types of parcel sorters having individual parcel carrying units, for example, tilt-tray sorters, among others.

Cross-belt parcel sorters are highly sensitive to the precise orientation of the parcels being inducted. Optimal productivity and reliability for a given sorting system may be achieved by appropriate parcel orientation and accurate induction. This is schematically illustrated in FIG. 1, where the left hand side depicts parcel orientations that are "Bad" or non-optimal for high productivity and reliability, and the right hand side depicts parcel orientations that are "Good" or optimal for high productivity and reliability.

Figure 1:
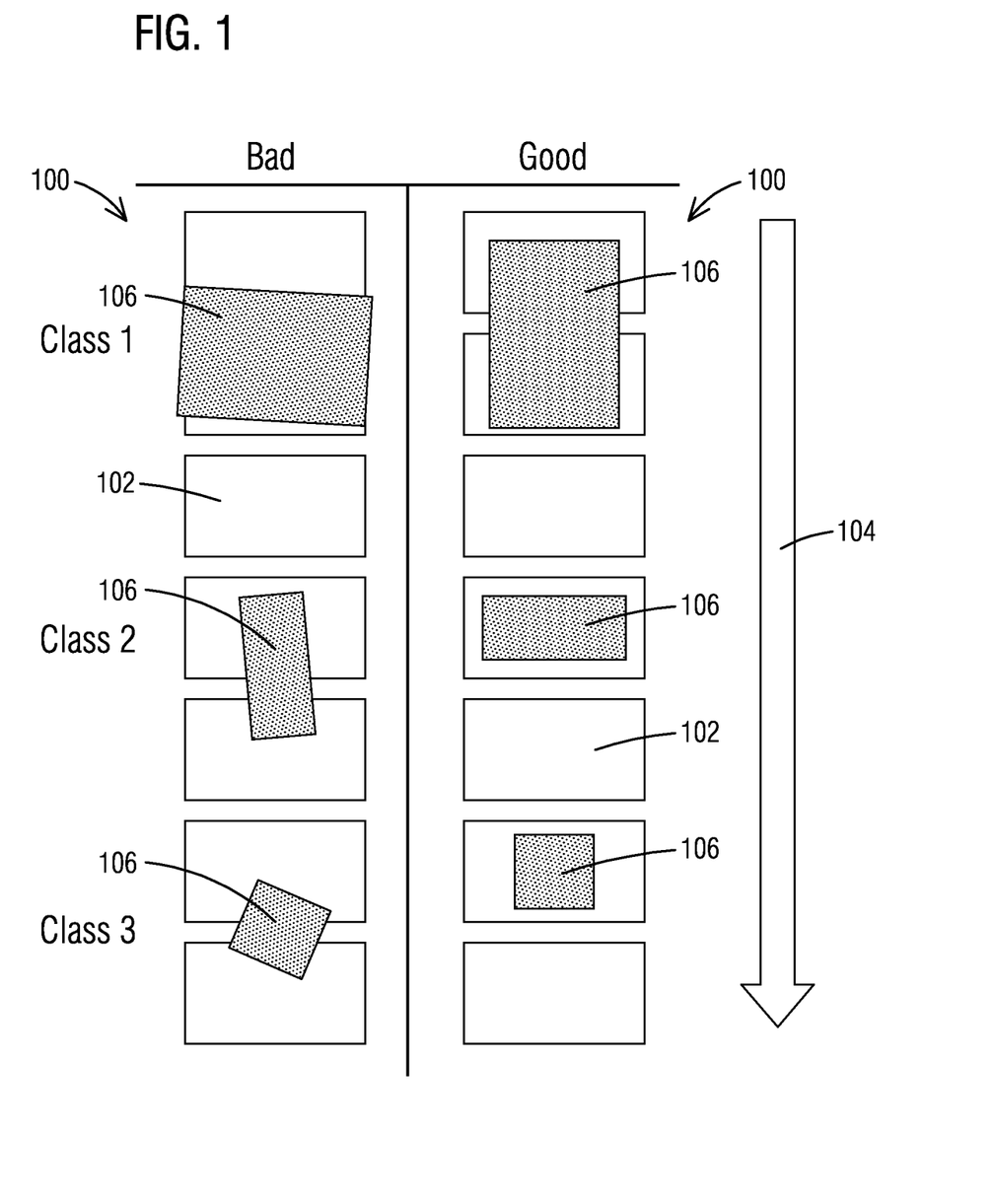
FIG. 1 is a schematic illustrating desirable orientation of parcels in a sorting conveyor with parcel carrying units.

Referring to FIG. 1, the cross-belt parcel sorter 100 in each case comprises parcel carrying units 102 movable along a feed path 104. Parcels 106 inducted into the parcel sorter 100 may occupy one or more of the parcel carrying units 102 depending upon the size and/or orientation of the respective parcels 106. As shown, parcels of Class 1 are of a size that will not fit in a crosswise induction into a single parcel carrying unit 102. A desirable or "Good" orientation for inducting the parcel in this case is a lengthwise orientation, which provides the greatest margin for high reliability. In contrast, parcels of Class 2, when inducted in a lengthwise orientation, represents wasted sorter capacity, which is undesirable or "Bad". In this case, a crosswise orientation at induction is desirable or "Good". Parcels of Class 3 are small enough to fit an individual parcel carrying unit 102 in any orientation. However, as shown, an inaccurate or "Bad" induction has nonetheless caused a placement across two parcel carrying units 102, which represents a waste in sorting capacity. Inaccurate placement during induction may prevent subsequent sorting.

The processing and conveyor systems upstream of the parcel sorter typically convey parcels in a lengthwise orientation, with the long axis in line with the feed path, and standard carton alignment systems make this alignment more precise. Meanwhile, induction in motion generally requires the induction conveyor to be oriented at a convergence angle of significantly less than 90 degrees. This angle has to be offset to establish the "Good" orientations shown above.

Figure 2:
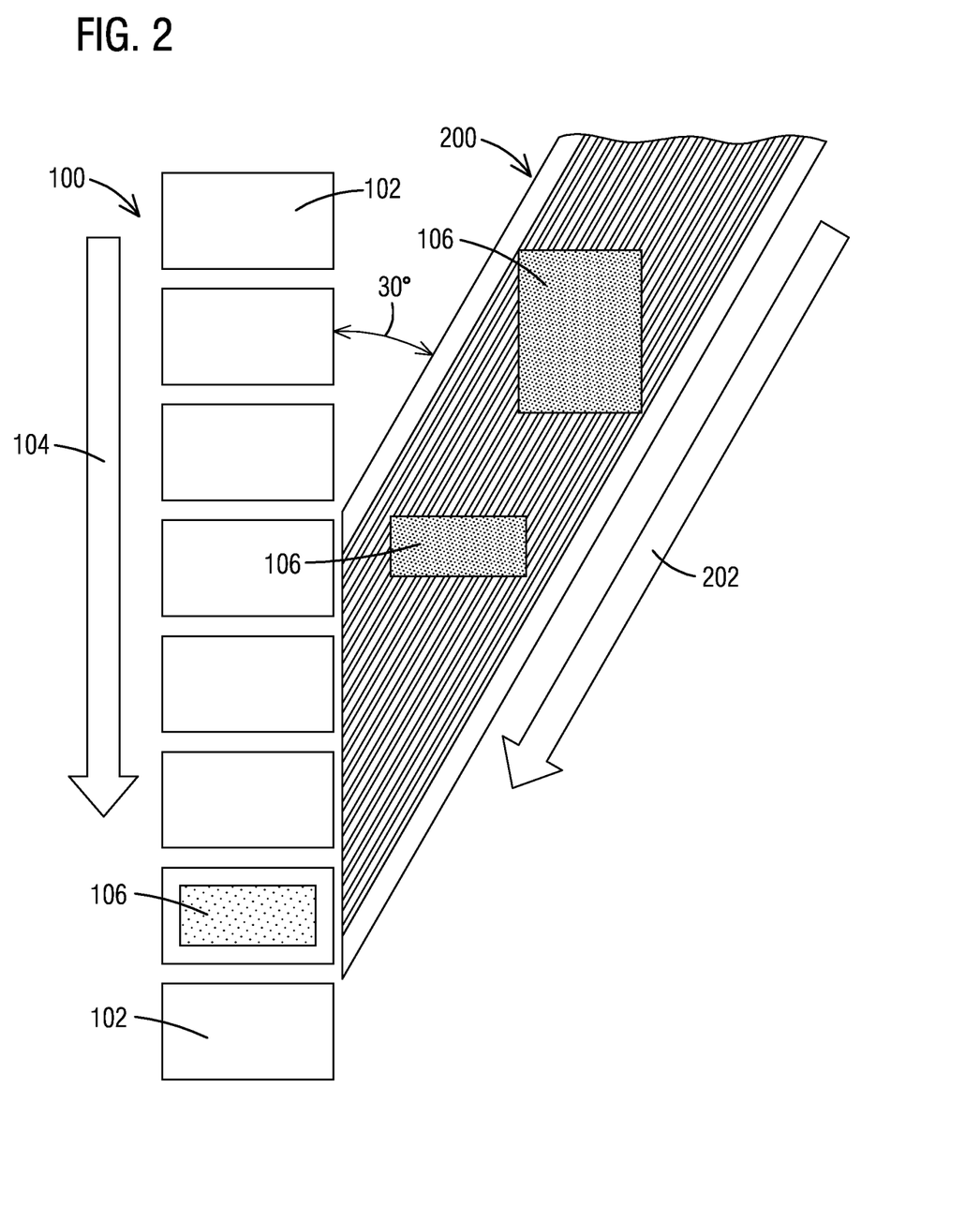
FIG. 2 is a plan view illustrating desired orientation of parcels in an induction conveyor feeding to a parcel sorter with parcel carrying units.

FIG. 2 shows an induction conveyor 200 feeding parcels 106 to a cross-belt parcel sorter 100. The induction conveyor 200 has an induction feed path 202 that is inclined at a convergence angle of 30 degrees to the sorter feed path 104. As shown, a 30 degree convergence angle in induction results in the necessity that parcels 106 on the induction conveyor 200 be oriented with an offset to the standard (lengthwise) orientation. Moreover, the two shapes of parcels 106 on the induction conveyor 200 each require different orientation offsets from the induction feed path 202 to achieve "Good" orientation as indicated in FIG. 1. This requires different upstream processing according to the orientation requirements due to the shapes of the parcels. As shown in the FIG. 1, a third orientation requirement (Class 3) could be described as "does not matter." For parcels belonging to this class, no orientation processing is needed, and processing needs simply to be optimized for their generally small size.

Figure 3:
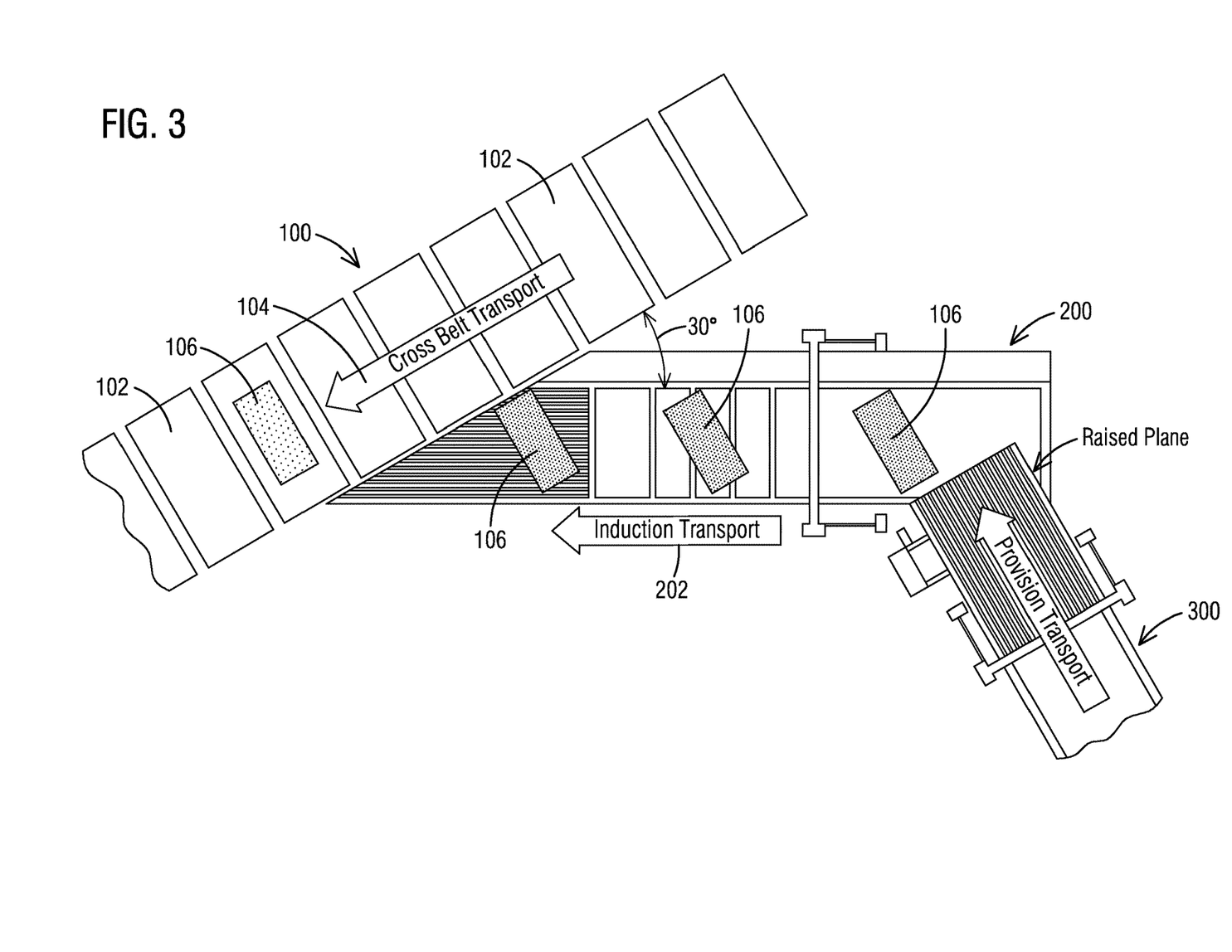
FIG. 3 is a plan view illustrating a simple, single merge to an induction conveyor from a provision transport.

FIG. 3 illustrates a provision transport conveyor 300 loading parcels on to an induction conveyor 200 which, in turn, feeds to a cross-belt parcel sorter 100. The cross-belt parcel sorter 100 and the induction conveyor 200 are typically in the same plane. The operation of the cross-belt parcel sorter 100 and the induction conveyor 200 are synchronized to achieve a precise positioning of parcels 106 being inducted into the cross-belt parcel sorter 100. An exemplary synchronization technique for achieving the above is described in the patent document U.S. Pat. No. 4,915,209A.

According to the state of the art, the induction conveyor 200 typically includes a simple conveyor belt providing transport along a single vector, which is the direction and speed that the conveyor belt is running. The plane of the provision transport conveyor 300 is typically raised above the induction conveyor 200 a sufficient distance so that with both transports running through the process, the parcel being transferred is launched a significant distance onto the induction conveyor 200 before coming into contact with it, as affected by momentum and the center of gravity of the parcel shifting to the induction conveyor 200.

The above-described technique may be made to offer relatively consistent orientation accuracy with relatively high throughput. However, when a wide range in parcel formats, particularly as regards variability in length, must be supported, the orientation accuracy suffers. This inaccuracy is due to inconsistent delay between the contact of the leading edge of the parcel versus the contact of the entirety of the bottom surface. During the delay, the vector of the induction conveyor 200 causes rotation of the parcel being transferred. This rotation can be accommodated by altering the angle of the provision transport conveyor 300 in relation to the induction conveyor 200, which would only work when parcels have a consistent shape.

Figure 4:
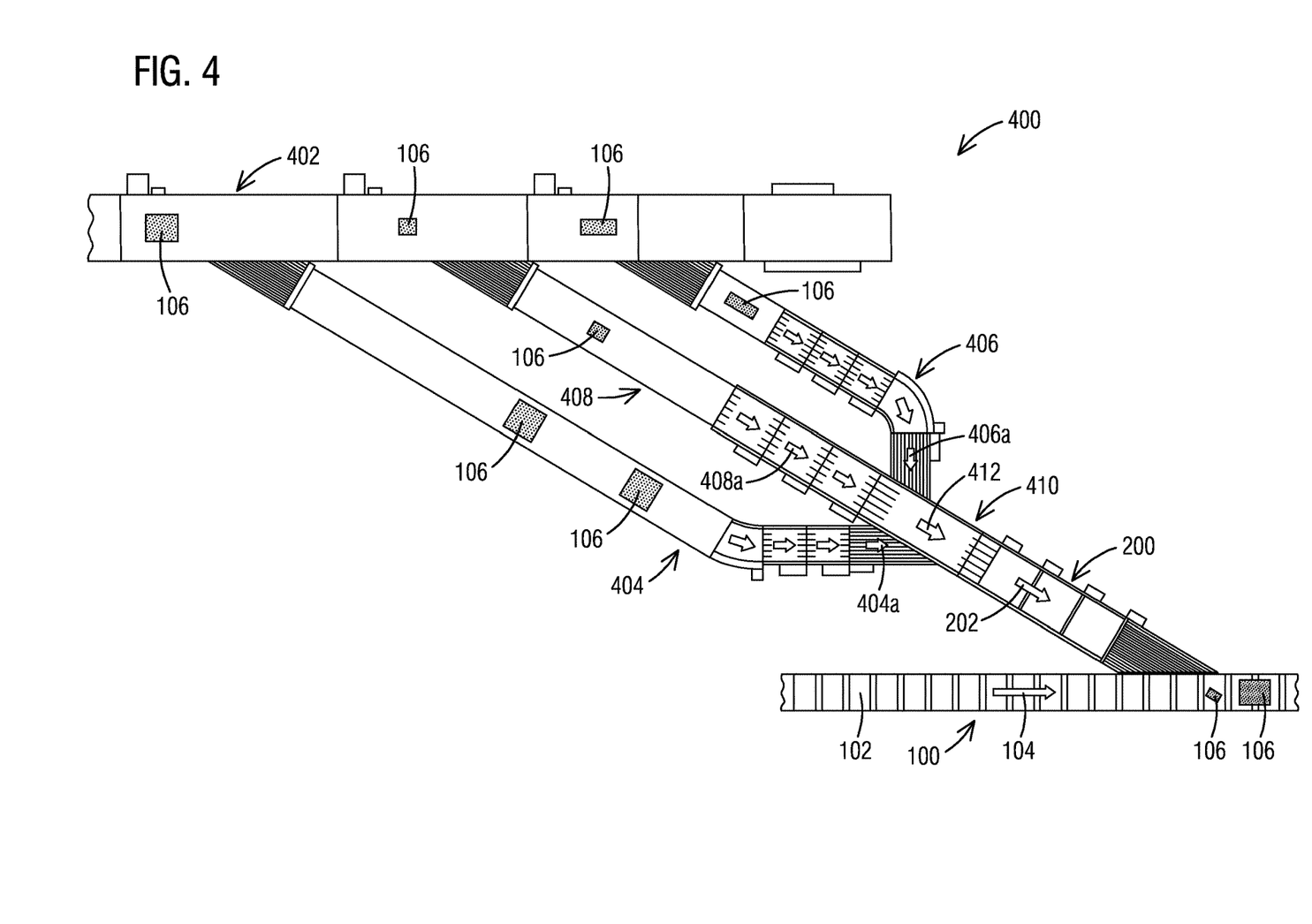
FIG. 4 is a plan view of a parcel processing system according an aspect of the disclosure.

FIG. 4 illustrates a parcel processing system 400 according to an aspect of the present disclosure, which integrates a merging conveyor system, though which multiple parcel orientations are continuously supported. The parcel processing system comprises a plurality of infeed conveyors 404, 406, 408 each conveying parcels with an assigned orientation class. The parcel processing system 400 also includes a merging conveyor 410 configured to merge parcels 106 fed by the infeed conveyors 404, 406, 408 into a single stream of parcels. The infeed conveyors 404, 406, 408 are arranged to feed parcels 106 to the merging conveyor 410 along respective infeed paths 404a, 406a, 408a. An induction conveyor 200 feeds the merged stream of parcels 106 along an induction feed path 202 to a sorting conveyor 100. The sorting conveyor 100 includes a plurality of parcel carrying units 102 moving along a sorter feed path 104 inclined at an angle to the induction feed path 202. The infeed paths 404a, 406a, 408b are arranged at different angular orientations in relation to a merging feed path 412 of the merging conveyor 410 such that each parcel 106 in the merged stream of parcels 106 has an orientation that is dependent upon the assigned orientation class of that parcel 106. The overall operation of the parcel processing system may be controlled, for example, by a computerized control system (not shown).

In one embodiment, as shown, the parcel processing system 400 comprises an upstream sorting system 402 configured to sort parcels 106 based on measurement of a parcel shape, assign an orientation class to each parcel based on the parcel shape and divert parcels sorted by orientation class to respective infeed conveyors 404, 406, 408. The sorting system 402 receives a stream of parcels 106 from upstream parcel processing equipment, typically including a parcel singulation device. Upstream of the sorting system 402, an array of sensors and cameras (not shown) may be employed for scanning the parcels 106 being transported, to measure a shape of the parcels (for e.g., including measurement of the length, width and height dimensions) as well as for capturing information in barcodes and other machine-readable text available on the packaging.

Based on the measured shape, an orientation class is assigned to each parcel 106. For instance, a first orientation class may be defined which includes parcels 106 that should be inducted in a lengthwise orientation on to the sorting conveyor 100, for example, because they are of a size that will not fit when inducted in a crosswise orientation on to the parcel sorter 100. A second orientation class may be defined which includes parcels 106 that should be inducted in a crosswise orientation on to the sorting conveyor 100, for example because they would under-utilize the capacity of the sorting conveyor 100 when inducted in a lengthwise orientation. Additionally, a third orientation class (described as "does not matter") may be defined which includes parcels 106 that would individually fit into a parcel carrying unit 102 of the parcel sorter 100 in any orientation. The orientation classes defined herein are exemplary, it being understood that the definition and the number of orientation classes may vary depending on the application.

The orientation class being assigned, separation according to the infeed and orientation class then takes place at the sorting system 402, which may include, for example, a shoe sorter or any other linear sorting mechanism. The sorting decision at the sorting system 402 potentially encompasses both the infeed and the orientation class, and may additionally incorporate sorting according to multiple virtual sorters within the physical sorter. In addition, the sorting system 402 may enable parcels belonging to the third orientation class ("does not matter") to be diverted to any of the three infeed conveyors 404, 406, 408, which increases the potential buffering capacity for this class.

In various other embodiments, the use of the upstream sorting system 402 may be obviated. For example, in one embodiment, manual sorting of parcels may be carried out based on shape to assign an orientation class to each parcel. Alternatively, it may even be possible to sort parcels by shape, and accumulate the parcels of respective orientation classes in batches prior to induction. Processing the orientation classes in batches would also simplify the control of the system 400.

The infeed conveyors 404, 406, 408 may be configured to feed parcels 106 to the merging conveyor 410 in a lengthwise orientation to the respective infeed paths 404a, 406a, 408a, conforming with the standard carton alignment.

Figure 5:
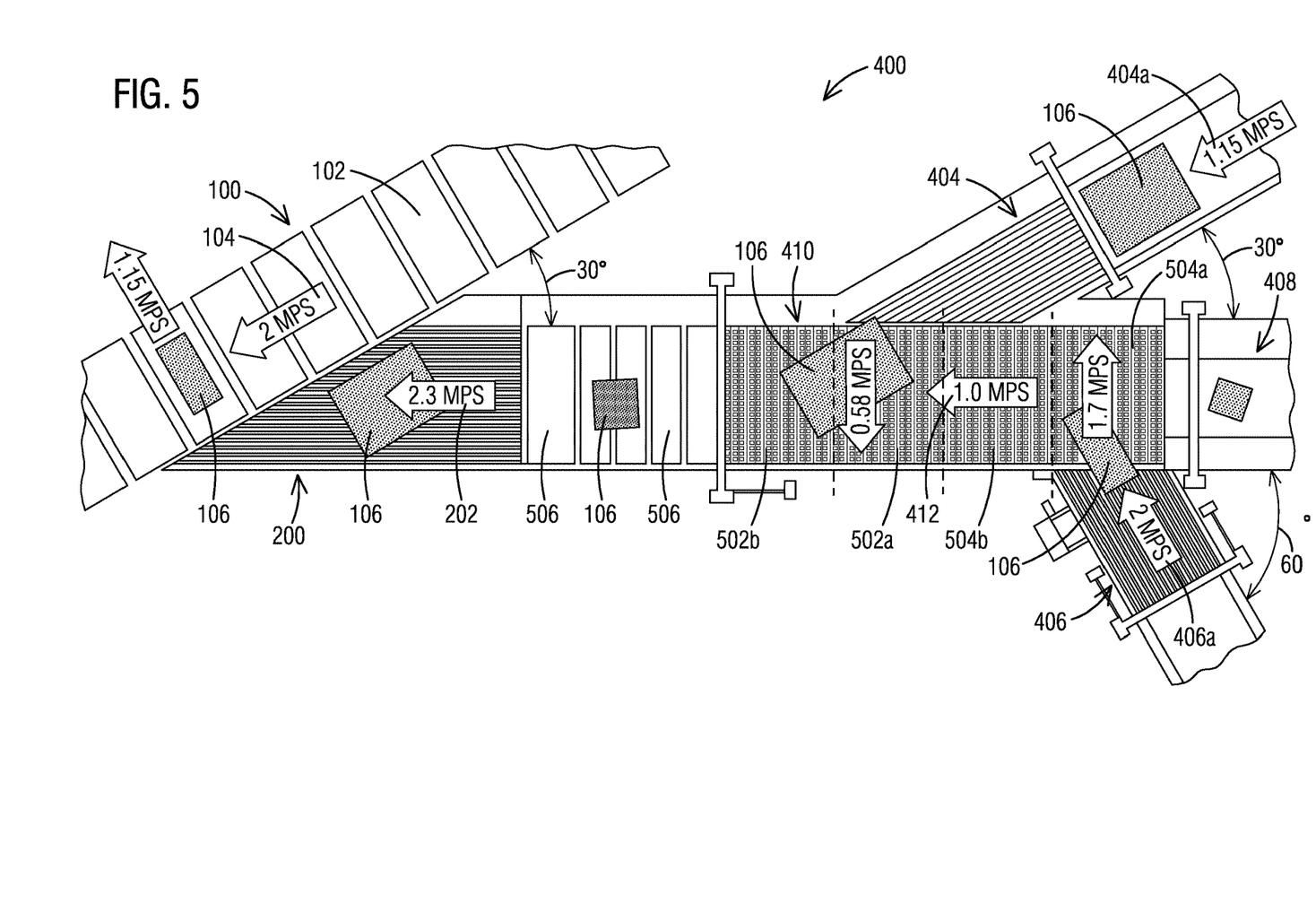
FIG. 5 is a plan view of portion of a parcel processing system with active merge mechanism illustrating an example implementation of merging and inducting parcels of mixed orientation classes with static feeds.

In the disclosed embodiment, a first infeed conveyor 404 feeds parcels 106 assigned to the first orientation class to the merging conveyor 410 along the respective infeed path 404a and a second infeed conveyor 406 feeds parcels 106 assigned to the second orientation class to the merging conveyor 410 along the respective infeed path 406a. As shown, the infeed paths 404a and 406a are perpendicular to each other. The infeed paths 404a and 406a are oriented in relation to the merging feed path 412 such that in the merged stream of parcels 106 fed to the sorting conveyor 100, parcels 106 belonging to the first orientation class have a lengthwise orientation while parcels 106 belonging to the second orientation class have a crosswise orientation in relation to the sorter feed path 104. In the shown configuration, the merging feed path 412 is collinear with the induction feed path 202. Also, in the shown configuration, the induction feed path 202 has a convergence angle of 30 degrees in relation to the sorter feed path 104. Accordingly, the first infeed path 404a and the second infeed path 406a are oriented with a convergence angle of 30 degrees and 60 degrees respectively in relation to the merging feed path 412, as best shown in FIG. 5. It will be appreciated that the angular orientations of the infeed paths 404a, 406a may be determined as a function of the convergence angle of induction to the sorting conveyor 100.

Furthermore, in the disclosed embodiment, a third infeed conveyor 408 has an infeed path 408a collinear with the merging feed path 412. The third infeed conveyor 408 is used for feeding only parcels assigned to the third orientation class to the merging conveyor 410.

In the state of the art, parcel merging is accomplished by raising the plane of the input conveyor higher than the plane of the output conveyor (merging conveyor) into which parcels are being merged to accommodate the convergence vector. Ideally, converging parcels are airborne as they merge, and pancake onto the output conveyor after their trailing edge has cleared the input conveyor. However, in the non-ideal reality, the leading edge contacts the output conveyor surface prior to the trailing edge clearing the merge, which causes the parcel to rotate on the landing, leading to inaccurate orientation.

As an improvement to the above, according to the disclosed embodiment, the merging conveyor 410 is configured to enable active merging of parcels 106 loaded from the infeed conveyors 404, 406, 408. In this embodiment, the merging conveyor 410 comprises a multi-axis transport mechanism configured to move parcels 106 along a principal axis parallel to the merging feed path 412 and a secondary axis perpendicular to the principal axis. The merging conveyor 410 is operable to selectively activate movement along the secondary axis for centering parcels 106 being loaded on to the merging conveyor 410. This allows the infeed conveyors 404, 406, 408 to be disposed in the same plane as the merging conveyor 410 while obviating the inaccuracies associated with the state of the art.

In one embodiment, the merging conveyor 410 is controlled to establish a speed along the secondary axis such that loading of parcels 106 on the merging conveyor 410 takes place at zero relative velocity. Merging parcels at zero relative velocity provides increased speed and orientation accuracy. The speed along the secondary axis may be determined, for example, as a function of the speed along the principal axis, speed of infeed, and the convergence angle between the merging feed path and the infeed path, to resolve the convergence vector (for example, as described in the patent document U.S. Pat. No. 4,915,209A). To that end, in one embodiment, the merging conveyor 410 may comprise multiple merges that are each associated with a respective infeed conveyor, wherein speed along the secondary axis is independently controllable for the different merge zones to achieve the above technical effect (merging at zero relative velocity) for each merge zone. This is illustrated in the examples depicted in FIG. 5-8. For example, in FIG. 5, the merge zones 502a, 502b are associated with the first infeed conveyor 404 and are selectively activated for providing movement along the secondary axis for merging parcels of the first orientation class. The merge zones 504a, 504b are associated with the second infeed conveyor 406 and are selectively activated for providing movement along the secondary axis for merging parcels of the second orientation class.

The multi-axis transport mechanism may be implemented, for example, by employing rollers rotatable at axes which are arranged to provide movement in a direction transverse to the merge feed path 412. An example construction of a multi-axis transport mechanism is disclosed in the patent document U.S. Pat. No. 7,344,018B2. According to this construction, a conveyor system comprises rollers rotatable at axes oblique to the direction of belt travel, to establish an alternative axis of motion to the principal axis established by the direction of belt travel. Motion along this alternative axis can be controlled by controlling the frequency of rotation of the rollers. The angle of the alternative axis of motion is established by the orientation of the axes for the rollers. The rollers turned by a system of variable speed rotating actuators, which can be raised to contact the rollers from the bottom side of the belt. The construction disclosed in the patent document is directed to a diverter.

An embodiment of the present disclosure may be implemented by modifying the above-described construction, such that the roller axes, instead of being oblique to the principal axis, are arranged such that the alternate axis of motion of the merging conveyor 410 is oriented 90 degrees in relation to the principal axis (which is the direction of the merging feed path 412). Adapting the construction principle described in U.S. Pat. No. 7,344,018B2 to a merging conveyor provides a flexible merge upstream of the induction transport, through which the control and multi-vector synchronization of speeds during merge may be maintained, for example as taught by U.S. Pat. No. 4,915,209A. Using this method, multiple orientation classes of parcels can be accurately supported at relatively high speed in a single device.

In one embodiment, the sorting conveyor 100 is a cross-belt parcel sorter, where each parcel carrying unit 102 comprises a cross-belt configured to be driven at 90 degrees to the sorter feed path 104. The sorting conveyor 100 may be operable to establish a cross-belt speed such that loading of parcels 106 on the sorting conveyor 100 takes place at zero relative velocity. To that end, the induction conveyor 200 may include multiple belted conveying sections 506 (see FIG. 5) to accelerate the parcels to the required induction speed. In various other embodiments, the sorting conveyor 100 may comprise other types of parcel sorters, for example, tilted-tray parcel sorters, among others.

FIG. 5 shows portion of a parcel processing system 400 with active merge mechanism illustrating an example implementation of merging and inducting parcels of mixed orientation classes with static feeds. In the shown implementation, the speeds illustrated are based on certain fixed speeds, and within common physical limitations for conveyance of parcels. In this example, the cross-belt parcel sorter 100 has a sorter feed speed of 2 MPS (393.7 FPM), which is near the maximum for mixed parcels including small parcels. For large parcels, the maximum speed can be nearly 3 MPS (591 FPM). The sorter feed speed may be adaptable, so that during periods in which the highest processing rates are not necessary, the speed may be lowered to save energy. Based on a 2 MPS of sorter feed speed, and with a 30 degree convergence angle between the sorter feed path 104 and the induction feed path 202, the speed of the induction belts would need to be 2.31 MPS (454.7 FPM). The cross-belts themselves would have to run at 1.15 MPS (226.4 FPM) at 90 degrees to the sorter feed path 104 to resolve the convergence vector.

For merging of the parcels of the second orientation class, the limitation is associated with the relatively high speed required to merge at 60 degrees for parcels fed by the second infeed conveyor 406, which, if limited to 2 MPS (393.7 FPM), determines a speed of 1.0 MPS (197 FPM) along the principal axis of motion of the merging conveyor 410. Meanwhile, the rotating actuators of the merge zones 504a, 504b would have to be selectively activated to establish a speed of 1.7 MPS (334.6 FPM) along the secondary axis of motion. For each parcel being loaded, when the merge is completed, the rotating actuators in the active merge zone would be deactivated, and the parcel would have been centered on the surface of the merging conveyor 410.

For merging of the parcels of the first orientation class, with a 30 degree convergence angle, and keeping the same 1 MPS (197 FPM) speed along the principal axis of the merging conveyor 410, the infeed conveyor 404 would need to operate at 1.15 MPS (226.4 FPM). The rotating actuators of the related merge zones 502a, 502b would be selectively activated to establish a speed of 0.58 MPS (114.2 FPM) along the secondary axis of the merging conveyor 410. For each parcel being loaded, when the merge is completed, the rotating actuators in the active merge zone would be deactivated, and the parcel would have been centered on the surface of the merging conveyor 410.

Parcels belonging to the third orientation class, including small parcels whose orientation does not matter, would be allowed to flow straight in to the merging conveyor 410, which may be operated at the same speed as when merging the first and second orientation classes 2 (1 MPS). The merge zones remain inactive during merging of a parcel belonging to this orientation class.

In an alternate implementation, the merging conveyor 410 may be operated at dynamically determined speeds along its principal axis depending on the speed settings of infeed conveyors 404, 406, 408. In this dynamic scenario, only small parcels are generally limited in speed to 2 MPS (393.7 FPM), which, depending on the physical characteristics of the composition of the customers parcels, might only include the third orientation class ("does not matter").

Figure 6:
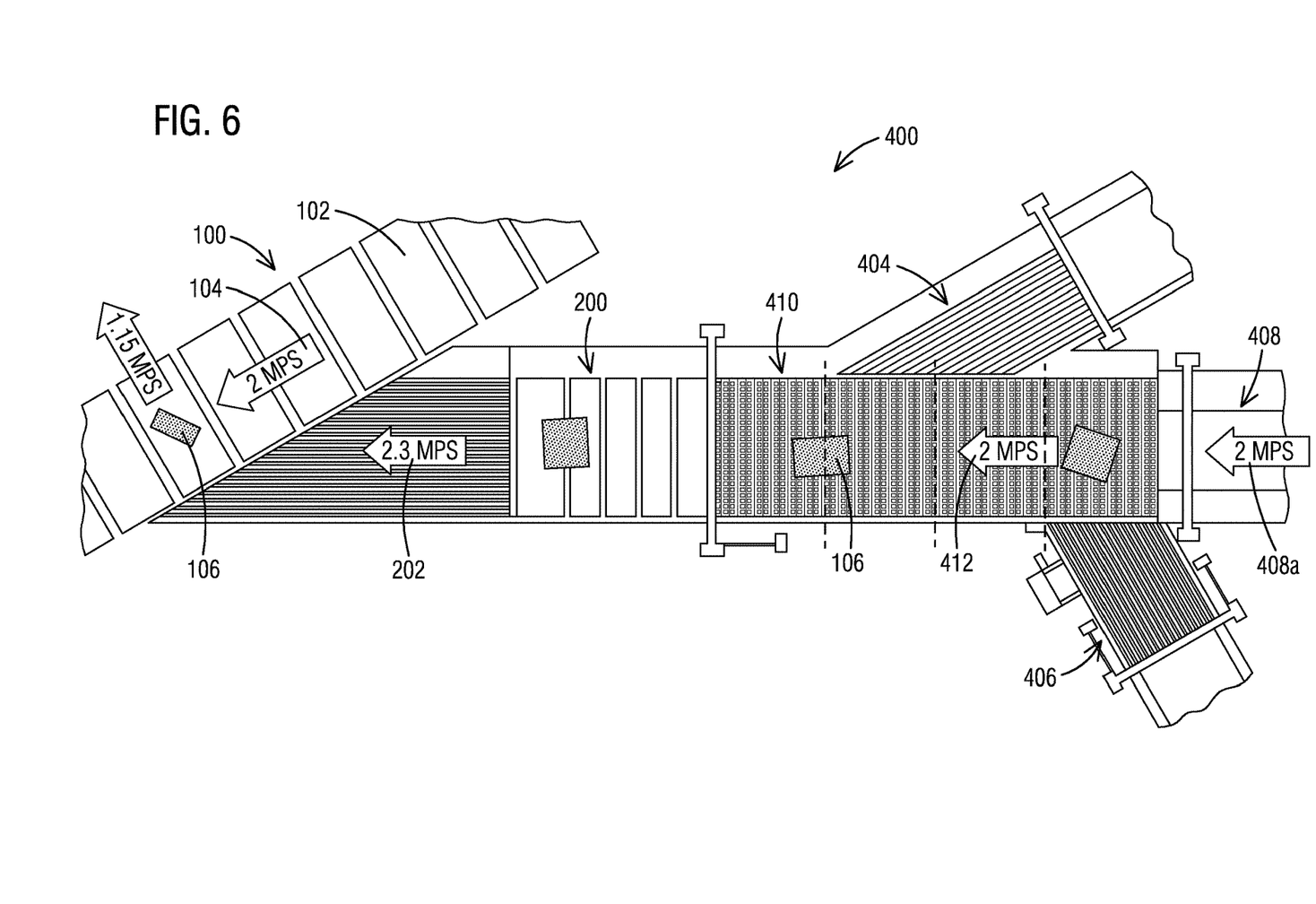
FIG. 6, FIG. 7 and FIG. 8 are plan views of portion of the parcel processing system with active merge mechanism illustrating an example implementation of dynamic speed adaption to optimize performance for various orientation classes of parcels.

FIG. 6 illustrates an example speed setting for induction of parcels of the third orientation class in a dynamic speed mode. As shown, during this time, the merge zones remain inactive and the merging conveyor 410 only provides movement along the principal axis. The speed along the principal axis of the merging conveyor 410 is set equal to the infeed speed at 2 MPS (393.7 FPM).

Figure 7:
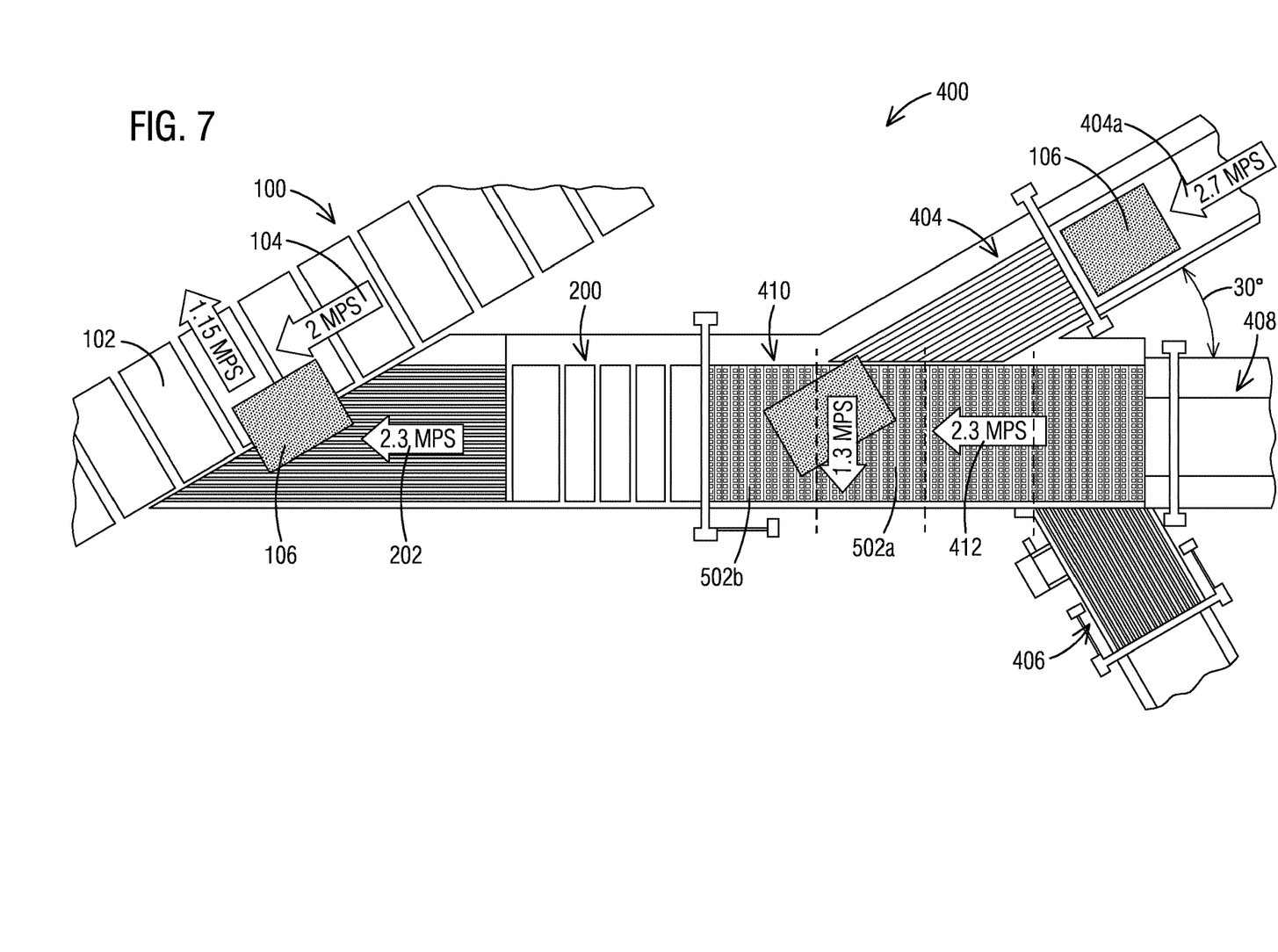

FIG. 7 illustrates an example speed setting for induction of parcels of the first orientation class in a dynamic speed mode. For a convergence angle of 30 degrees and an infeed speed setting of 2.7 MPS (531.5 FPM), the speed along the principal axis of the merging conveyor 410 is determined to be 2.3 MPS (452.8 FPM). To resolve the convergence vector, the speed along the secondary axis in the merge zones 502a. 502b is determined to be 1.3 MPS (255.9 FPM). As described before, the merge zones 502a, 502b are selectively activated to provide movement along the secondary axis for merging, and are deactivated when centering has been accomplished.

Figure 8:
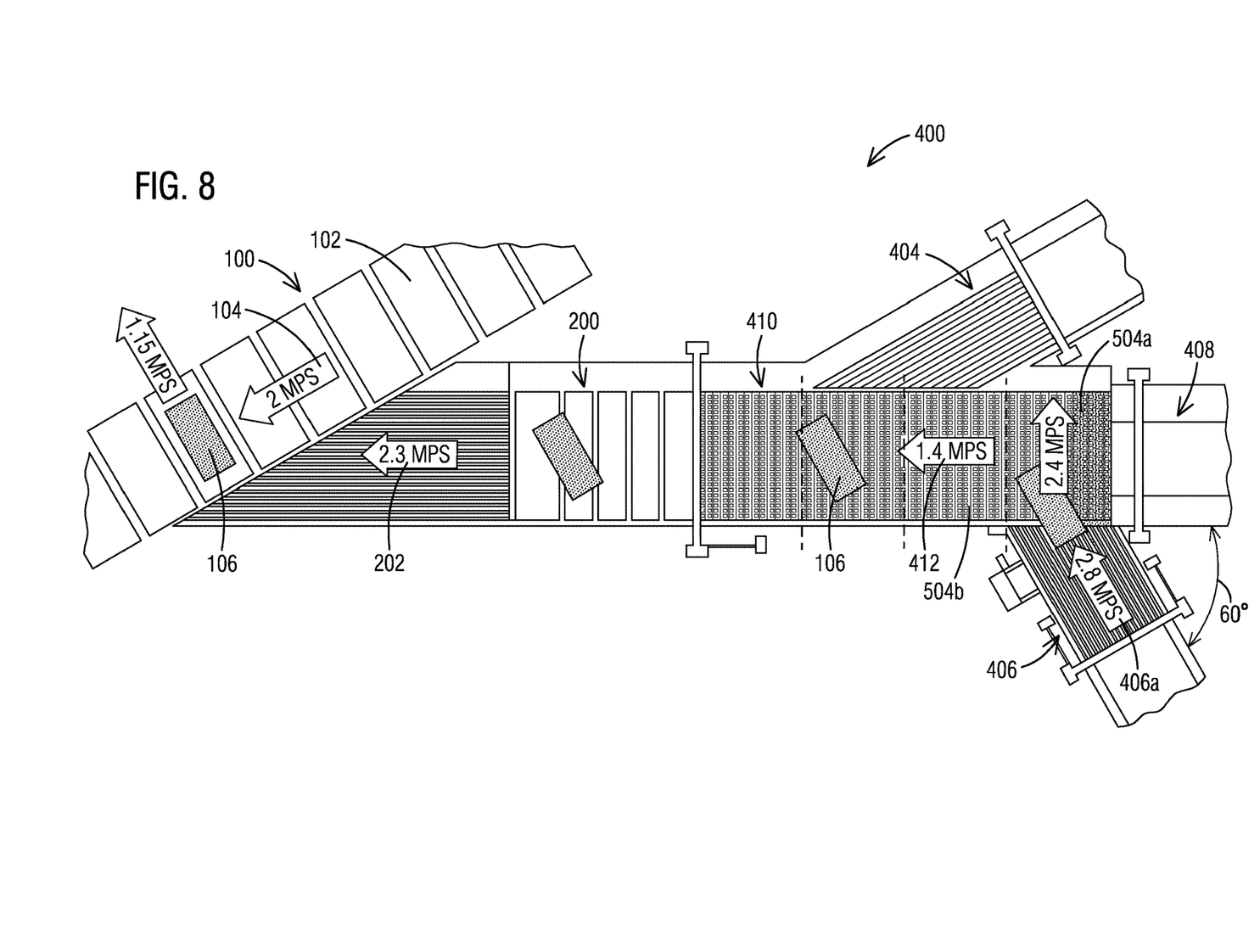

FIG. 8 illustrates an example speed setting for induction of parcels of the second orientation class in a dynamic speed mode, assuming this class does not include small, unstable items. For a convergence angle of 60 degrees and an infeed speed setting of 2.8 MPS (551.2 FPM), the speed along the principal axis of the merging conveyor 410 is determined to be 1.4 MPS (275.6 FPM). To resolve the convergence vector, the speed along the secondary axis in the merge zones 504a, 504b are determined to be 2.4 MPS (472.4 FPM). As described before, the merge zones 504a, 504b are selectively activated to provide movement along the secondary axis for merging, and are deactivated when centering has been accomplished.

In the dynamic speed mode, transition between orientation classes would be timed to take place once convergence associated with the former orientation class is complete, within the maximum transport speed constraints of the parcels between the merge and the induction.

The system and processes of the figures are not exclusive. Other systems and processes may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

The invention claimed is:

1. A parcel processing system comprising:
a plurality of infeed conveyors each conveying parcels with an assigned orientation class,
a merging conveyor configured to merge parcels fed by the infeed conveyors into a single stream of parcels,
an induction conveyor configured to feed the merged stream of parcels along an induction feed path to a sorting conveyor,
the sorting conveyor comprising a plurality of parcel carrying units moving along a sorter feed path inclined at an angle to the induction feed path,
wherein the infeed conveyors are arranged to feed parcels to the merging conveyor along respective infeed paths, the infeed paths being arranged at different angular orientations in relation to a merging feed path of the merging conveyor such that each parcel in the merged stream of parcels has an orientation that is dependent upon the assigned orientation class of that parcel, and
wherein the merging conveyor comprises a multi-axis transport mechanism configured to move parcels along a principal axis parallel to the merging feed path and a secondary axis perpendicular to the principal axis, the merging conveyor being operable to selectively activate movement along the secondary axis for centering parcels being loaded on to the merging conveyor.

2. The parcel processing system according to claim 1, wherein the merging conveyor is controllable to establish a speed along the secondary axis such that loading of parcels on the merging conveyor takes place at zero relative velocity.

3. The parcel processing system according to claim 1, wherein the merging conveyor comprises multiple merge zones that are each associated with a respective infeed conveyor, wherein speed along the secondary axis is independently controllable for the different merge zones.

4. The parcel processing system according to claim 1, wherein the infeed conveyors are configured to feed parcels to the merging conveyor in a lengthwise orientation in relation to the respective infeed paths.

5. The parcel processing system according to claim 1, wherein
the infeed conveyors comprise a first infeed conveyor for feeding parcels assigned to a first orientation class to the merging conveyor along a first infeed path and a second infeed conveyor for feeding parcels assigned to a second orientation class to the merging conveyor along a second infeed path, and
the first and second infeed paths are perpendicular to each other and are oriented in relation to the merging feed path such that:
in the merged stream of parcels fed to the sorting conveyor, parcels belonging to the first orientation class have a lengthwise orientation in relation to the sorter feed path and parcels belonging to the second orientation class have a crosswise orientation in relation to the sorter feed path.

6. The parcel processing system according to claim 1, wherein the sorting system is configured to assign an orientation class "does not matter" to parcels that are capable of individually fitting into a parcel carrying unit of the sorting conveyor in any orientation, and to enable parcels assigned to the orientation class "does not matter" to be diverted to any of the infeed conveyors.

7. The parcel processing system according to claim 6, wherein the infeed conveyors comprises an infeed conveyor with an infeed path colinear with the merging feed path for feeding only parcels assigned to the "does not matter" orientation class to the merging conveyor.

8. The parcel processing system according to claim 1, wherein the infeed conveyors are disposed in the same plane as the merging conveyor.

9. The parcel processing system according to claim 1, further comprising an upstream sorting system configured to sort parcels based on measurement of parcel shape, assign an orientation class to each parcel based on the parcel shape and divert parcels sorted by orientation class to respective one of the infeed conveyors.

10. The parcel processing system according to claim 1, wherein each of the parcel carrying units of the sorting conveyor comprises a cross-belt configured to be driven at 90 degrees to the sorter feed path, the sorting conveyor being operable to establish a cross-belt speed such that loading of parcels on the sorting conveyor takes place at zero relative velocity.

11. A method for processing parcels comprising:
conveying parcels with an assigned orientation class to a respective infeed conveyor of a plurality of infeed conveyors,
merging parcels fed by the infeed conveyors into a single stream of parcels on a merging conveyor, feeding the merged stream of parcels by an induction conveyor along an induction feed path to a sorting conveyor, the sorting conveyor comprising a plurality of parcel carrying units moving along a sorter feed path inclined at an angle to the induction feed path, wherein the infeed conveyors are arranged to feed parcels to the merging conveyor along respective infeed paths, the infeed paths being arranged at different angular orientations in relation to a merging feed path of the merging conveyor such that each parcel in the merged stream of parcels has an orientation that is dependent upon the assigned orientation class of that parcel, wherein the merging conveyor comprises a multi-axis transport mechanism configured to move parcels along a principal axis parallel to the merging feed path and a secondary axis perpendicular to the principal axis, and wherein the method comprises:

controlling the merging conveyor to selectively activate movement along the secondary axis for centering parcels being loaded on to the merging conveyor.

12. The method according to claim 11, comprising controlling the merging conveyor to establish a speed along the secondary axis such that loading of parcels on the merging conveyor takes place at zero relative velocity.

13. The method according to claim 11, wherein the merging conveyor comprises multiple merge zones that are each associated with a respective infeed conveyor, the method comprising:

independently controlling speed along the secondary axis for the different merge zones.

14. The method according to claim 11, comprising feeding parcels by the infeed conveyors to the merging conveyor in a lengthwise orientation in relation to the respective infeed paths.

15. The method according to claim 11, comprising:

feeding parcels assigned to a first orientation class to the merging conveyor by a first infeed conveyor along a first infeed path, and feeding parcels assigned to a second orientation class to the merging conveyor by a second infeed conveyor along a second infeed path, wherein the first and second infeed paths are perpendicular to each other and are oriented in relation to the merging feed path such that:

in the merged stream of parcels fed to the sorting conveyor, parcels belonging to the first orientation class have a lengthwise orientation in relation to the sorter feed path and parcels belonging to the second orientation class have a crosswise orientation in relation to the sorter feed path.

16. The method according to claim 11, comprising:

assigning an orientation class "does not matter" to parcels that are capable of individually fitting into a parcel carrying unit of the sorting conveyor in any orientation, and enabling parcels assigned to the orientation class "does not matter" to be diverted to any of the infeed conveyors.

17. The method according to claim 16, comprising feeding only parcels assigned to the "does not matter" orientation class to the merging conveyor via one of the infeed conveyors which has an infeed path colinear with the merging feed path.

18. The method according to claim 11, wherein the infeed conveyors are disposed in the same plane as the merging conveyor.

19. The method according to claim 11, further comprising:

upstream of the infeed conveyors, sorting parcels based on measurement of parcel shape, assigning an orientation class to each parcel based on the parcel shape, and diverting parcels sorted by orientation class to the respective infeed conveyors.

20. The method according to claim 11, wherein each of the parcel carrying units of the sorting conveyor comprises a cross-belt configured to be driven at 90 degrees to the sorter feed path, the method comprising:

controlling the sorting conveyor to establish a cross-belt speed such that loading of parcels on the sorting conveyor takes place at zero relative velocity.

* * * * *

UNITED STATES PATENT AND TRADEMARK OFFICE
CERTIFICATE OF CORRECTION

| | |
|---|---|
| PATENT NO. | : 11,999,575 B2 |
| APPLICATION NO. | : 17/779155 |
| DATED | : June 4, 2024 |
| INVENTOR(S) | : Francisco Grupp et al. |

It is certified that error appears in the above-identified patent and that said Letters Patent is hereby corrected as shown below:

In the Specification

Column 2, Line 49:
After "of" (first occurrence) insert -- a --

Column 2, Line 53:
"portion" should be — portions —

Column 2, Line 54:
"mechanism" should be — mechanisms —

Column 4, Line 67:
"though" should be — through —

Column 5, Line 15:
"408b" should be — 408a —

Column 7, Line 20:
"FIG." (first occurrence) should be — FIGS. —

Column 7, Line 42:
After "rollers" (second occurrence) insert -- are --

Column 8, Line 5:
After "shows" insert -- a --

Column 8, Line 63:
Delete "customers"

Signed and Sealed this
Thirty-first Day of December, 2024

Derrick Brent
*Acting Director of the United States Patent and Trademark Office*

Column 9, Line 12:
"502a." should be — 502a, —

In the Claims

Column 10, Claim 5, Line 18:
After "wherein" insert -- : --

Column 10, Claim 7, Line 42:
"comprises" should be — comprise —

Column 10, Claim 7, Line 43:
"colinear" should be — collinear —

Column 12, Claim 17, Line 21:
"colinear" should be — collinear —